Aug. 5, 1941.     F. O. GIESECKE     2,251,448
STARCH MAKING PROCESS
Filed June 29, 1938
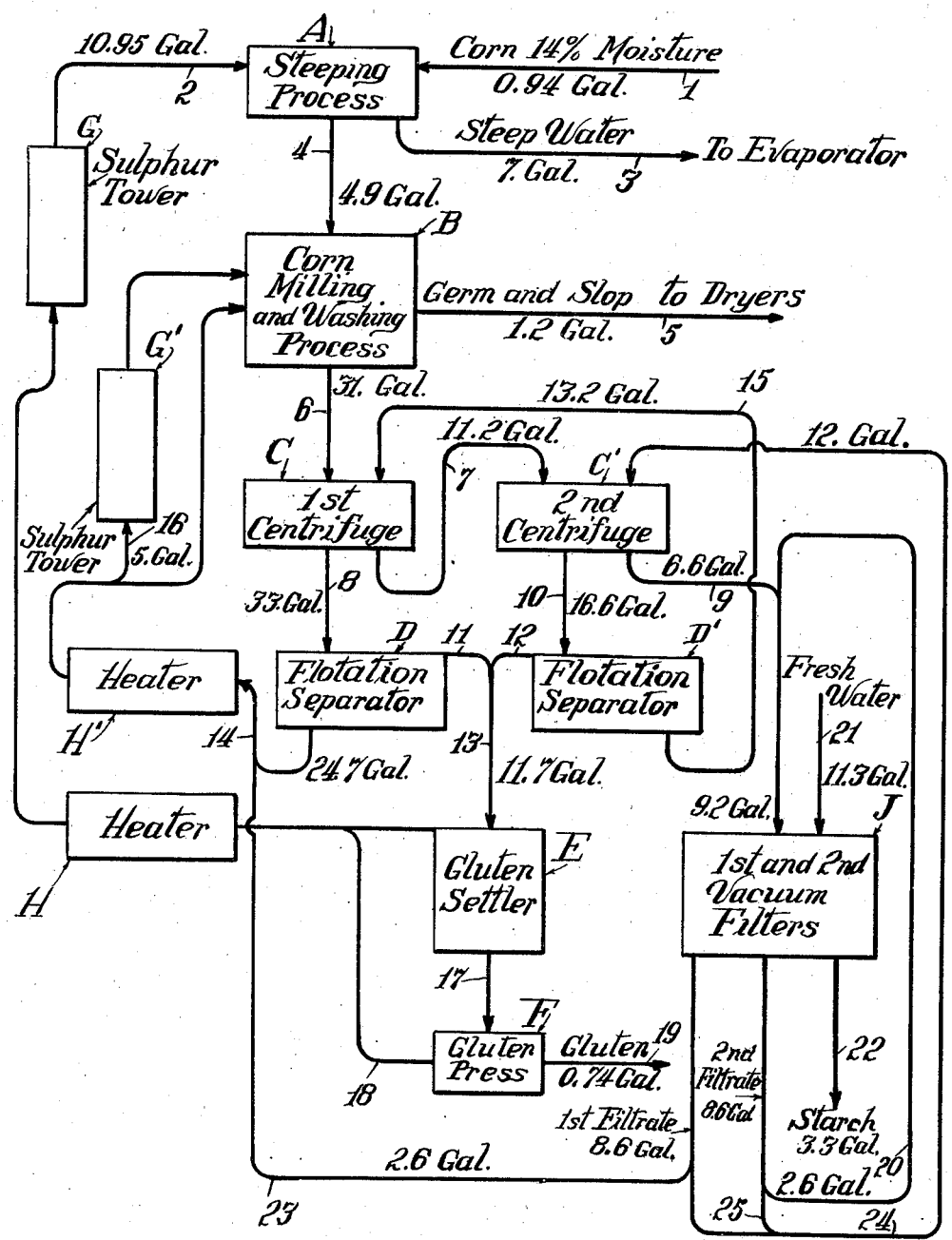
Inventor
Fred O. Giesecke
By Barnett + Truman
Attorneys Patented Aug. 5, 1941

2,251,448

UNITED STATES PATENT OFFICE 2,251,448

STARCH MAKING PROCESS

Fred O. Giesecke, Kilmacolm, Scotland, assignor, by mesne assignments, to Corn Products Refining Company, a corporation of New Jersey Application June 29, 1938, Serial No. 216,523
In Great Britain June 16, 1938

1 Claim. (Cl. 127—68)

This invention relates to the production of starch from corn (maize), and its primary object is to provide a simple and economical starch making system, in which centrifugal machines and flotation separators are used for the separation of gluten from starch in place of the usual starch tables, in such arrangement with the other instrumentalities of the starch making system that an adequate separation is effected as between the starch and the non-starch constituents of the corn, more especially as between starch and protein, so that the starch in gluten and the protein in starch are reduced to a minimum.

A further object of the invention is to provide a starch making process in which all or substantially all of the process waters (except the corn steep water and the waters absorbed in the discharged solids: starch, gluten, germs and slops) are returned and re-used in the process; whereby the system (except for the outlets above referred to) is a closed system with no process waters, or substantially none, going to the sewer.

A further object is to use in the steeping operation all, or substantially all, of the water from the gluten settlers, which water by standing becomes more or less subject to bacterial contamination, whereby this water is discharged as steep water from the system for evaporation, to save its soluble content, without going into the mill house (germ, coarse slop and fine slop systems); and to use, as a wash water in the mill house, water removed from the mill starch (starch, gluten and water free from hull and fibre) by the centrifugals and flotation separators, which water, because these operations require but a short time, is a comparatively pure water, whereby contamination of the material in the mill house is reduced to a minimum and the starch given a maximum purity without excessive washing. The use of water extracted from the mill starch instead of fresh water is a monetary saving of importance.

The invention is illustrated in the accompanying flow sheet diagram.

On the flow sheet, A designates the corn steeping system, ordinarily consisting of a series of steep tanks in counter-current arrangement. In the mill house, designated B, the steeped corn is broken up, the germ removed and washed, and the rest of the corn ground up and subjected to coarse slop and fine slop separating and washing operations, yielding a combined stream, from the three operations of starch, gluten and water known as "mill starch." The mill starch from B is centrifuged in a centrifugal machine C. The stream from centrifuge C, containing most of the starch, but with some gluten, which will be referred to as "starch water" is given another centrifuging operation in the centrifugal machine C'. D and D' are flotation separators which receive the gluten containing streams from the centrifugals C, C', respectively which will be referred to as "gluten water." The gluten from the flotation separators D, D' passes, with some water, into the gluten settler E. The remainder of the liquid in the flotation separators D, D' is discharged continuously therefrom before the residual insolubles settle therein, and is immediately reused as a wash water as hereinafter described. F is a gluten press for pressing out the water, so far as possible, from the gluten subsiding in the settler E. G is a sulphur tower for sulphurizing the water from the gluten settler E before it is returned to the corn steeping system A, and H is a heater for heating this water. H' is a heater for heating the water which passes from the flotation separator D to the mill house. If this water requires sulphurization, it, or a part of it, may be passed through the sulphur tower G'. J designates a starch washing system in which the starch from the second centrifuge C' is dewatered and washed successively in two or more vacuum filters, or other washing devices, as shown, for example, in United States Patent No. 1,651,611 to Rush O. McCoy, filed December 6, 1927.

It will be understood that if desired the starch might be given a third or even a fourth washing in additional washing filters. Similarly additional centrifugals might be used for treating the mill starch. The drawing shows single units, but it will be understood that in most cases these will be multiplied. By the term "pipe" is intended any suitable conduit.

The operation of the apparatus as a closed system (except for the water outlets referred to above) is as follows: the numerals on the drawing followed by the abbreviation "Gal." representing gallons (United States) of water per bushel of corn ground, these figures being, of course, approximate only, depending on particular manufacturing conditions:

The corn, containing 0.94 gallon of moisture, enters the steeping system at 1 and is steeped with 10.95 gallons of gluten settler water entering through conduit 2, in which conduit is located sulphur tower G and heater H. The steep water (7 gallons) passes through pipe 3 to the evaporators (not shown). The steeped corn, containing 4.9 gallons of water, passes to the mill house through pipe 4. The mill house operations are preferably the usual operations employed in this part of the process. The corn is coarse ground so as to free the germ from the rest of the kernel; the germ is floated off and washed to free it of starch and gluten; the rest of the corn is finely ground in Buhr mills; the ground material is subjected to a coarse slop separation and washing in copper reels or on copper shaking sieves; the mill starch from this operation is screened through silk screens and the residue subjected to a fine slop separating and washing operation for removing starch and gluten from the fine slop. The germs and slops are discharged from the mill house at 5 and contain 1.2 gallons of water. The mill starch from the germ, coarse slop and fine slop systems, 31 gallons, passes through pipe 6 to the first centrifuge C. The starch water from this centrifuge, containing most of the starch but with some gluten (11.2 gallons), passes through pipe 7 to the second centrifuge C'. The gluten water from centrifuge C (33 gallons), containing most of the gluten but some starch, passes through pipe 8 to the flotation separator D. The starch water from the second centrifuge C' (6.6 gallons) passes through pipe 9 to the washing system J. The gluten water from centrifuge C' (16.6 gallons), the solids in which are mostly gluten but with some starch, passes through pipe 10 to the flotation separator D'. The flotation separators D and D' serve two functions: They de-aerate the liquids which have been aerated by action of the centrifuges so that such liquids may be conveniently handled in the latter steps of the process; and they effect a further separation as between gluten and residual starch therein, an operation made possible by the aeration which has taken place on the centrifugal machines. The aerated gluten floats on the liquid separators and is removed therefrom through pipes 11 and 12 and the common pipe 13 to the gluten settler; the amount being 11.7 gallons. The larger portion of the water from the flotation separators, containing some starch in each case, is drawn off, 24.7 gallons of such water passing from the flotation separator D through pipe 14 to the heater H' and thence to the mill house; while 13.2 gallons are drawn off from flotation separator D' and pass through pipe 15 to the first centrifugal machine C where this water is used as a wash water in the centrifuging operation. 5 gallons of the water from heater H' passes by pipe 16 to the sulphur tower G' and then to the mill house.

The gluten which subsides in gluten settler E is drawn off through pipe 17 to the gluten press F, the water from which passes through pipe 18 back to pipe 2. The gluten from the press discharged at 19, contains 0.74 gallon of water. The starch from the second centrifuge C', entering washing system J through pipe 9, is diluted with 2.6 gallons of filtrate from the second washing filter of said system which filtrate reaches pipe 9 through pipe 20; and the diluted starch stream (9.2 gallons), which is at a proper density for treatment in the usual starch washing vacuum filters, is de-watered and washed, re-pulped and de-watered and washed a second time, in the washing system J; the washing system being supplied with fresh water, 11.3 gallons through pipe 21. The starch from the washing system J is discharged at 22 and contains 3.3 gallons of water.

Of the first filtrate from the washing system J (8.6 gallons) 2.6 gallons passes through pipe 23 to pipe 14, heater H' and the mill house B, and the rest through pipe 24 to the second centrifuge C' as a wash water. Of the 8.6 gallons of second filtrate, 2.6 gallons pass through pipes 25 and 20 to pipe 9 and to the washing system, the rest going through pipes 25 and 24 to the second centrifuge, the total amount of the wash water being 12 gallons. That is, the light filtrate from the washing system is reused in part as the second centrifuge wash water and in part for diluting the starch in the washing system.

The intention is to cover by patent all equivalents of the above described instrumentalities and all processes within the scope of the appended claim.

I claim:

Process of obtaining starch from corn which comprises: steeping the corn; subjecting the steeped corn to mill house operations yielding a mixture of starch, gluten and water; centrifuging said mixture at the same density it leaves the mill house operations and subjecting the overflow to a de-aerating and flotation operation whereby gluten is skimmed from the top of the body of liquid before the gluten has settled to any considerable extent; centrifuging the entire underflow from the first centrifuging operation and subjecting the entire overflow from the further centrifuging operation to a de-aerating and flotation operation; subjecting the entire underflow from the further centrifuging operation to a filtering and washing operation from which the starch is discharged from the process; returning the water from the first mentioned flotation operation to the mill house and the water from the second mentioned flotation operation to the first centrifuging operation, as a wash water; introducing the gluten from the flotation operations into a gluten settler; and re-using the water from the gluten settler exclusively for steeping corn.

FRED O. GIESECKE.